Figure 1:
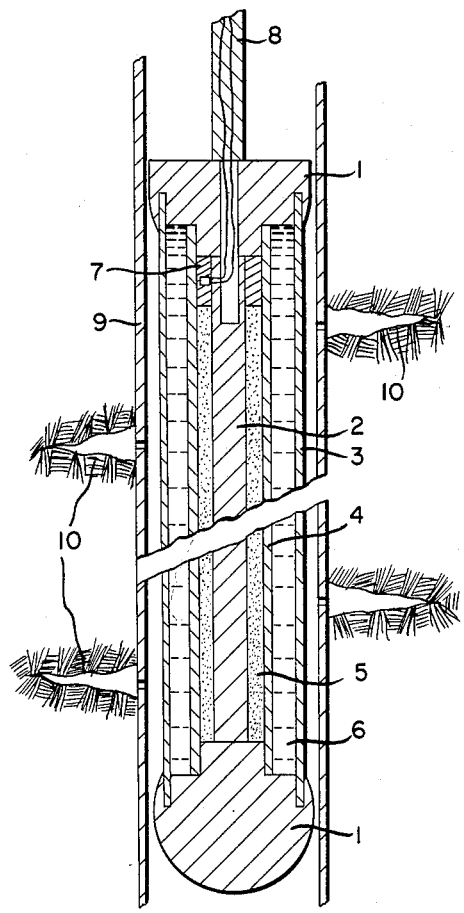
Figure 2:
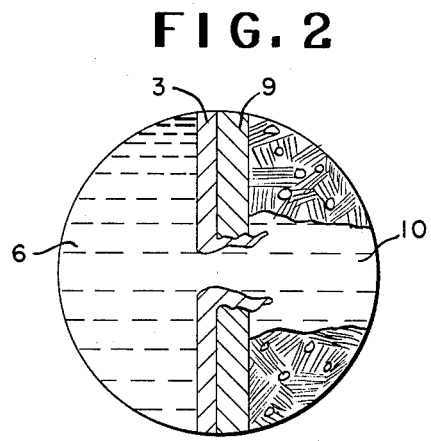

United States Patent Office 3,121,464
Patented Feb. 18, 1964

3,121,464
HYDRAULIC FRACTURING PROCESS
Jimmie L. Huitt, Glenshaw, and Bruce B. McGlothlin, Aspinwall, Pa., assignors to Gulf Research & Development Company, Pittsburgh, Pa., a corporation of Delaware
No Drawing. Filed Aug. 18, 1959, Ser. No. 834,385
2 Claims. (Cl. 166—42)

This invention relates to a method for treating wells. It is more specifically concerned with the art of fracturing formations, and still more particularly with a process for hydraulically fracturing earth formations with the aid of solid propping agents.

Within recent years hydraulic fracturing processes have been employed to create artificial fractures adjacent a producing well to increase the productivity of the fluid bearing formation. In general, such processes consist in forcing a fracturing fluid into a producing well in sufficient volume and under sufficient pressure to rupture the formation. The fracturing fluid is forced to enter the induced crack and extend the fracture for substantial distances into the formation. After the injection pressure has been released the fracture produced in the formation tends to close due to the weight of the overburden. In order to keep the fracture open, granular insoluble solids such as sand are usually suspended in the fracturing medium. The granular solids upon being carried into the fracture act as props and hold open the fracture after the injection pressure is released. In the prior art fracturing processes the particle size of the propping material employed is most commonly about 20 to 40 mesh (0.03–0.01 inch) and it is the practice to virtually pack the fracture with multi-layers of the propping material.

We have determined that it is often desirable in fracturing operations to employ propping materials significantly larger in size than those heretofore employed. We have determined that it is advantageous to employ as propping materials granular solids having particle sizes up to as large as about 0.50 inch in diameter. Granular solids having particle sizes in the range from about 0.20 inch to about 0.50 inch in diameter are particularly advantageous and are employed in accordance with this invention. The ability of a fracture in a subterranean formation to conduct formation fluids to the well bore, that is, the fluid flow capacity of the fracture, is usually dependent upon the permeability and the width of the fracture. We have found that wide fractures of exceptionally high flow capacity are obtained by depositing a mono-layer of these large size propping materials within the fracture. The fluid flow capacity of the fractures propped with a mono-layer of the large size propping materials is significantly greater than can be obtained by completely packing the fracture with small size propping materials as is currently done in the art. Thus, for example, in an earth formation a fracture having a width of 0.2 inch and a fluid flow capacity of approximately 2000 millidarcy feet may be obtained by packing the fracture with a propping material of 20 to 40 mesh size, while in the same formation a fracture having a fluid flow capacity of anywhere from 500 to 1000 times greater may be obtained by depositing within the fracture a propping material of a particle size of about 0.3 inch in diameter in such amount that the resulting partial mono-layer of the propping agent is partially embedded in the faces of the formation forming the fracture. A partial mono-layer of propping material is achieved when space exists between particles of the propping material and the particles are not closely packed as would be the case with a total or complete mono-layer.

While it is therefore advantageous to employ as propping materials in hydraulic fracturing operations, granular solids having particle sizes in the range of about 0.20 inch to about 0.50 inch in diameter, serious difficulties are frequently encountered in introducing such materials into a formation fracture. It is, of course, desired that the introduction of the propping agent into the fracture be unimpeded and the particles of propping agent be distributed throughout the radius of the fracture. Frequently the large size propping materials can not be used with success in hydraulic fracturing operations because of the fact that the large size materials refuse to satisfactorily enter the fracture and tend to be deposited prematurely within the fracture near the well bore forming a bridge therein. This condition is referred to in the art as "sand out" or "screen out" and may result in failure of the hydraulic fracturing operation to increase the productivity of the formation.

It is accordingly an object of this invention to provide a hydraulic fracturing technique employing propping materials having particle sizes significantly larger than those employed in prior art fracturing processes and which are unique in maintaining wide fractures of high fluid carrying capacity. It is also an object of the invention to provide a hydraulic fracturing technique which facilitates the use of the large size propping materials while avoiding the difficulties usually associated with the introduction of such materials into formation fractures.

In accordance with the novel hydraulic fracturing technique of this invention, a suitable fracturing fluid which may be any of the conventional fracturing fluids is injected into an earth formation which is to be fractured and sufficient pressure is applied to the fluid to break down or crack the formation. Packers may be, and preferably are, used to isolate and confine the section of the formation in which the fracture is desired. The breakdown of the formation or initiation of the fracture is usually indicated by a sudden drop in pressure at the well head signifying that the fracturing fluid is entering the induced fracture. After the fracture has been thus started or initiated, injection of the fracturing fluid is continued at a suitable rate to extend the fracture a desired distance back into the formation. Extension of the fracture is ordinarily achieved with lower pressure than that required to initiate the fracture. During this operation a suitable additive is incorporated into the fracturing fluid for the purpose of effecting a seal on the surfaces of the fracture and to prevent loss of the fracturing fluid to the exposed permeable formation on each side of the fracture. Seal-forming materials of this type are well known and are generally referred to as a low fluid loss materials or penetration retardants. Examples of such materials are sugar cane, dextrose, ammonium sulfate, blown asphalt or other high molecular weight or complex molecules, such as dodecyl benzene sulfonate salts, sodium lauryl sulfate, and the like. The various fluid loss additives described in U.S. Patent No. 2,779,735 can likewise be employed. As the fracturing fluid containing the fluid loss additive is injected into the fracture, the fluid loss additive forms a filter-cake or seal on the exposed surfaces of the fracture. This seal on the surfaces of the fracture reduces the fluid leak-off rate and permits extension of the fracture a desired distance into the formation by means of the fracturing fluid.

It is an important feature of the hydraulic fracturing method of this invention that no propping material be present in the fracturing fluid at the start of the fracturing operation or immediately subsequent to initiation of the fracture. In the present fracturing method the propping material is incorporated only into a later portion of the fracturing fluid of which portion of fluid a part thereof is expected to reach the extremities of the fracture. The portion of the fracturing fluid in which the propping material is incorporated can be readily calculated from the rate of injection of the fracturing fluid and the rate of fluid leak-off, that is, the rate at which the fracturing fluid is lost to the formation. Thus, for example, if it is desired to prop a fracture to a radius of about 150 feet and it is determined from laboratory data obtained with formation core samples that for the desired injection rate the fluid leak-off would be such that the first 400 barrels of fracturing fluid injected into the well would leak-off from the fracture to the formation and would not reach the extremity of the fracture, this portion (the first 400 barrels) of the fracturing fluid would be free of propping material. In this respect, the hydraulic fracturing technique of the invention distinctly differs from prior hydraulic fracturing methods in which the propping material is present in the fracturing fluid at the start of the fracturing operation or is incorporated in the fracturing fluid immediately subsequent to the initiation of the fracture when the formation begins to "take" the fracturing fluid.

Before introduction of the propping material into the latter portion of the fracturing fluid, a relatively high rate of injection of fracturing fluid into the formation is established. The particle size of the propping material employed is preferably from 0.20 inch to about 0.50 inch in diameter. The rate of injection of the fracturing fluid at the time of introduction of the propping material is relatively high and should be at least greater than 10 barrels per minute and preferably 30 to 40 barrels per minute. By means of the fracturing technique disclosed herein propping materials of large particle size can be injected into and deposited in a relatively uniform manner throughout a formation fracture while avoiding to a large extent the risk of "screening out."

As stated previously, the fluid employed to fracture the formation and to carry the granular propping material into the fracture can be any of the conventional fracturing fluids which have suitable low-penetrating characteristics. These fluids for the most part comprise hydrocarbon gels obtained by dispersing a suitable gelling agent in a hydrocarbon oil such as fuel oil, kerosene or crude oil. Commonly employed gelling agents include aluminum naphthenate and mixtures thereof with aluminum oleate, hydroxy aluminum soaps of fatty acids, aluminum and other metal soaps of the various fatty acids derived from coconut oil, peanut oil and the like. Aqueous fracturing fluids which may or may not contain a thickening agent such as a natural gum as for example, karaya, batu or guar gum, and which will allow the build-up of pressures sufficient to fracture the formation can also be employed. The characteristics of the fracturing fluid used will depend on the permeability of the formation to be fractured and the capacity of the pumps available for the operation. For example, if the permeability of the formation is very low or pumps of high capacity are available, water can be used as the fracturing fluid. In one preferred manner of operation which is particularly advantageous from an economic standpoint, a non-thickened petroleum oil such as lease crude oil is employed to initiate the fracture. The lease crude oil containing a fluid loss additive is utilized to extend the fracture and the lease crude oil thickened or gelled with a suitable gelling agent is utilized in the latter part of the fracturing operation to carry the propping agent into the fracture.

The propping materials employed in the invention can be any granular material having the desired large particle size. It is desirable to employ granular solids having particle sizes up to about 0.50 inch and granular materials having particle sizes within the range of about 0.20 inch to 0.50 inch in diameter are particularly suitable for use in accordance with this invention. Thus, the propping material can be selected from among such materials as crushed rock, gravel, wood chips, metal particles such as iron, steel or aluminum, ceramic materials and the like.

The large size propping agents are employed in the fracturing fluid in amounts varying over relatively wide limits. The maximum amount of propping material to employ in each instance is governed to a large extent by pumping rate or injection rate, the density of the particular propping material and the nature of the fracturing fluid employed, particularly its viscosity since it is this characteristic which determines the ability of the fluid to suspend the granular particles of propping agent. The optimum ratio of propping agent to fracturing fluid for a particular fracturing job can be determined prior to the start of the fracturing operation and is usually controlled by the overburden pressure and the embedment characteristics of the propping agent in the formation surfaces. Thus, the propping material, fracturing fluid and additives can be selected accordingly. In general, the large size propping agents can be employed in the fracturing fluids in amounts from about 0.05 pound per gallon to 10 pounds per gallon or more.

The fracturing method of the invention can be employed in open bore holes or in cased wells. When carrying out a fracturing operation in a cased well, the casing must be severed in such manner that the openings therein are sufficiently large to permit passage of the large size propping materials. Perforations made in a casing with the use of conventional perforators that result in simultaneous multiple perforations are ordinarily too small to allow the use of propping materials of the size contemplated herein. However, for the purposes of the present invention suitable size openings can be made in the casing by the use of casing-severing explosive charges such as those described in U.S. Patent No. 2,761,384 to Sweetman and others.

The following experimental operations and data illustrate the advantages obtained by the use of the large size propping agents of the invention.

A simulated fracture was achieved utilizing a core sample from a petroleum bearing formation. The core sample was cut into two pieces and the pieces were encased in epoxy resin to form a flow cell in which the flat surfaces of the two pieces of the core sample simulated a fracture. The flow cell was fitted with side and end seals, a flow entrance and exit and pressure taps. The propping agents were tested by placing the propping agent within the flow cell and subjecting the flow cell to a load in a hydraulic press to simulate a desired overburden pressure. The width of the fracture maintained by the propping agents was determined by measuring the distance between the two pieces of core sample by means of a cathetometer. Water was flowed through the flow cell and the flow capacity of the fracture calculated from the volume of water passing through the fracture and the pressure differential existing across the flow path from inlet to outlet. This procedure simulates a horizontal fracture in which there is substantially no fluid leak into the pores of the formation. Utilizing this procedure, propping materials of various sizes were placed in the flow cell and the cell subjected to a load in a hydraulic press until the force exerted on the flow cell was equivalent to an overburden pressure of about 3000 pounds per square inch. Water was then flowed through the simulated fracture and the flow capacity and fracture width determined as previously indicated.

The results obtained from this procedure were as follows:

*Example I*

[Fracture width=0.20 inch (±0.02 inch)]

| Propping Agent | Size of Propping Agent | Concentration | Flow Capacity (millidarcy-feet) |
|---|---|---|---|
| Sand | 20-40 Mesh (U.S. Sieve Series). | Multilayer Pack | 3,000 |
| Do | 8-16 Mesh (U.S. Sieve Series). | do | 30,000 |
| Do | 4-6 Mesh (U.S. Sieve Series). | do | 140,000 |
| Metal Spheres | 0.25 inch | 2.5 particles per square inch of fracture surface. | 5,000,000 |

*Example II*

[Fracture width=0.26 inch (±0.02 inch)]

| Propping Agent | Size of Propping Agent | Concentration | Flow Capacity (millidarcy-feet) |
|---|---|---|---|
| Sand | 20-40 Mesh (U.S. Sieve Series). | Multilayer Pack | 4,600 |
| Do | 8-16 Mesh (U.S. Sieve Series). | do | 41,000 |
| Do | 4-6 Mesh (U.S. Sieve Series). | do | 220,000 |
| Metal Spheres | 0.31 inch | 1.6 particles per square inch of fracture surface. | 14,000,000 |

The above data show the exceptionally high fluid flow capacity of the fractures propped with a partial monolayer of propping material of the size disclosed herein.

The following description of a specific fracturing operation will further illustrate the invention:

A well is drilled to a depth of 1653 feet and cased with 5½ inch casing to a depth of 1648 feet. A horizontal fracture of approximately 150 feet radius is desired in an oil sand at a depth of 1640 feet and the casing is severed at this point. A packer with hydraulic hold down is run on 2 inch tubing to a depth of 1630 feet. 200 gallons of 15 percent hydrochloric acid are circulated down the tubing until the acid reaches the bottom of the tubing. The packer is then set and the tubing is pressured with lease crude oil to a pressure of approximately 3200 p.s.i.g. at which time there is a sudden decrease in pressure indicating that a fracture has occurred. The tubing and packer are then removed from the well. The fluid leak-off characteristics of the formation as determined from a laboratory study with formation core samples indicate that at a pumping rate of 20 barrels per minute the first 400 barrels of fracturing fluid would leak from the fracture to the formation in generating the desired radius of the fracture. Lease crude oil containing a commercial fluid loss additive in a concentration of about 0.1 pound per gallon of crude oil is then pumped into the well. The lease crude oil containing the fluid loss additive but no propping agent is continuously injected into the well for about 20 minutes at a rate of about 20 barrels per minute. At the end of 20 minutes injection of lease crude oil gelled with a sodium soap of oleic acid is begun. The rate of injection of the gelled fracturing fluid is maintained at about 20 barrels of fluid per minute and a propping agent consisting of particles of crushed limestone is incorporated into the fracturing fluid. The crushed limestone particles have a size distribution such that approximately 80 percent of the particles are from about 0.30 to 0.37 inch in diameter. The propping agent is mixed with the fracturing fluid as it is pumped into the well at a rate to provide about 1 pound of propping agent per gallon of fracturing fluid. Injection of the fracturing fluid containing the crushed limestone propping agent is continued at the same rate for a period of 5 minutes, at which time the concentration of propping agent in the oil is increased to about 2 pounds per gallon. Injection of the fracturing fluid containing 2 pounds per gallon concentration of propping agent is then continued for an additional 15 minutes at a rate of about 20 barrels per minute. After all of the propping material is injected into the well, lease crude oil is then pumped into the well at the rate of 20 barrels per minute, to displace the gelled oil and propping agent into the fracture. The well is then shut-in for a period of about 6 hours. The fracturing fluid having a reduced viscosity as a result of commingling with formation fluids is withdrawn from the well during subsequent production, while the particles of propping agent are deposited and remain within the fracture to maintain it open and increase its fluid carrying capacity. By this operation, a fracture propped to a radius of 150 feet is obtained.

It is to be understood that the foregoing description of a specific embodiment of the invention is by way of illustration only and that various modifications can be made without departing from the invention. Thus, the invention can be utilized to fracture oil, gas or water formations to produce therein fractures of exceptionally high permeability. The fracturing technique of the invention is also applicable in secondary recovery operations employing gas- or water-drive where it is desired to improve the permeability of the formation.

The present invention provides for the use of propping materials of a size significantly larger than those heretofore employed whereby very wide fractures of high fluid carrying capacity can be maintained. With the use of propping agents of the size disclosed herein it is possible to obtain fractures of satisfactory fluid carrying capacity in formations in which small size propping materials are relatively ineffective. Furthermore, by means of the present invention the problem of injecting and obtaining a relatively uniform deposition of large size propping materials in a formation fracture is achieved while at the same time the risk of premature "screen out" and other difficulties is greatly reduced. It is to be understood that while the method of fracturing disclosed herein is particularly advantageous when employing propping agents of the size specifically disclosed, the method can be advantageously utilized in all instances where "screen out" difficulties are encountered.

Those modifications and equivalents which fall within the spirit of the invention and the scope of the appended claims are to be considered part of the invention.

We claim:

1. A process for hydraulically fracturing a subsurface formation penetrated by the borehole of a well, said subsurface formation being exposed to liquids displaced into said borehole, comprising pumping a liquid free of propping agent into the well, continuing the pumping of the liquid into the well whereby the pressure within the well increases until a break in the pressure indicates the creation of a fracture in the formation, after creation of the fracture displacing into the fracture a propping-agent-free liquid containing a fluid-loss additive capable of forming a seal on the exposed surfaces of the fracture to reduce loss of fracturing liquid therethrough to extend the fracture a desired distance into the formation, and thereafter displacing into the fracture at a rate in excess of 10 barrels per minute a suspension in a low-penetrating liquid of a propping agent whereby the propping agent is placed in the fracture to hold the fracture open, the concentration of the popping agent in the low penetrating liquid being between 0.05 and 10 pounds per gallon of low penetrating liquid and effective to form a monolayer of propping agent in the fracture.

2. A process for hydraulically fracturing a subsurface formation penetrated by the borehole of a well, said subsurface formation being exposed to liquids displaced into said borehole, comprising pumping a liquid free of propping agent into the well, continuing the pumping of the liquid into the well whereby the pressure within the well nicreases until a break in the pressure indicates the creation of a fracture in the formation, after creation of the fracture displacing into the fracture a propping-agent-free liquid containing a fluid-loss additive capable of forming a seal on the exposed surfaces of the fracture to reduce loss of fracturing liquid therethrough to extend the fracture a desired distance into the formation, and then displacing into the fracture at a rate in excess of 10 barrels per minute a suspension in a low-penetrating liquid of a propping agent comprising granular particles approximately 0.20 to 0.5 inch in diameter whereby the propping agent is placed in the fracture to hold the fracture open, the concentration of the propping agent in the low-penetrating liquid being between 0.05 and 10 pounds per gallon of low-penetrating liquid and effective to form a monolayer of propping agent in the fracture.

References Cited in the file of this patent

UNITED STATES PATENTS

| | | |
|---|---|---|
| 2,811,207 | Clark | Oct. 29, 1957 |
| 2,825,409 | Ring | Mar. 4, 1958 |
| 2,881,837 | Staudt | Apr. 14, 1959 |
| 2,888,988 | Clark | June 2, 1959 |
| 2,950,247 | McGuire et al. | Aug. 23, 1960 |

OTHER REFERENCES

Hydraulic Fracturing, Oil and Gas Journal, Sept. 6, 1954, pp. 109–112, W. E. Hassebroek et al.

Reynolds, J. J., et al.: Lease Crude as Cheap Fracturing Fluid, Oil and Gas Journal, June 6, 1955, pp. 133, 136, and 137.

Control That Fluid Loss, Oil and Gas Journal, Davis, J. G., et al. July 2, 1956, pp. 102, 104, 107, 108.

Why Should I Fracture and How, Oil and Gas Journal, J. O. Scott, Jan. 14, 1957, pp. 91–107.

Feb. 18, 1964     D. R. STEPHENS     3,121,465
DEVICE FOR TREATING OIL WELLS
Filed Dec. 19, 1960     2 Sheets-Sheet 1

INVENTOR
DONALD R. STEPHENS

BY *Ernest N. Beck*

ATTORNEY